(12) United States Patent
Huang et al.

(10) Patent No.: US 11,107,243 B2
(45) Date of Patent: Aug. 31, 2021

(54) FIDUCIAL MARKER BASED ON BLOCKS OF DIFFERENT GRAYSCALES

(71) Applicant: Dilili Labs, Inc., Santa Clara, CA (US)

(72) Inventors: Jiawei Huang, San Jose, CA (US); Simon Baker, Los Altos Hills, CA (US); Dexin Li, Fremont, CA (US); Xintian Li, Saratoga, CA (US)

(*) Notice: Subject to any disclaimer, the term of this patent is extended or adjusted under 35 U.S.C. 154(b) by 0 days.

(21) Appl. No.: 16/748,292

(22) Filed: Jan. 21, 2020

(65) Prior Publication Data

US 2020/0250855 A1    Aug. 6, 2020

Related U.S. Application Data

(60) Provisional application No. 62/799,163, filed on Jan. 31, 2019.

(51) Int. Cl.
| | |
|---|---|
| *G06K 9/00* | (2006.01) |
| *G06T 7/73* | (2017.01) |
| *G06T 7/33* | (2017.01) |
| *G06T 7/68* | (2017.01) |
| *G06K 9/62* | (2006.01) |
| *G06T 7/13* | (2017.01) |

(52) U.S. Cl.
CPC ............ *G06T 7/75* (2017.01); *G06K 9/6211* (2013.01); *G06T 7/13* (2017.01); *G06T 7/344* (2017.01); *G06T 7/68* (2017.01); *G06T 2207/10004* (2013.01); *G06T 2207/10024* (2013.01)

(58) Field of Classification Search
CPC .. G06T 7/75; G06T 7/68; G06T 7/344; G06T 7/13; G06K 9/6211
USPC ........................................................ 382/103
See application file for complete search history.

(56) References Cited

U.S. PATENT DOCUMENTS

| | | | |
|---|---|---|---|
| 2013/0140354 A1* | 6/2013 | Fan ................. | G06K 19/06037 235/375 |
| 2016/0379031 A1* | 12/2016 | Fang ................... | G06K 7/1443 235/462.04 |

* cited by examiner

*Primary Examiner* — Stephen P Coleman
(74) *Attorney, Agent, or Firm* — Jigang Jin (57) ABSTRACT

The present invention discloses fiducial marker systems or tag systems and methods to detect and decode a tag. The tag comprises a plurality of cells arranged in a grid pattern. The plurality of cells forms a square or rectangular shape. Each cell is in square or rectangular shape and has either black, white, or gray grayscale. Any two cells that share a common borderline should have different grayscales; and the four corner cells of the tag are all in black. The method for detecting and decoding such a tag comprises detecting a plurality of connected cells in an image, determining whether the plurality of connected cells in the image have all three grayscales, determining whether total number of cells in the plurality of connected cells is greater than a predetermined threshold, determining whether any two cells in the plurality of connected cells that share a common borderline in the image have different grayscales, and decoding the tag based on the grayscales of the plurality of connected cells in the image.

18 Claims, 7 Drawing Sheets

FIDUCIAL MARKER BASED ON BLOCKS OF DIFFERENT GRAYSCALES

CROSS-REFERENCE TO RELATED APPLICATION

This application claims priority to U.S. provisional patent application Ser. No. 62/799,163, filed Jan. 31, 2019, the entire content of which is incorporated herein by reference.

FIELD OF INVENTION

This invention generally relates to visual fiducial marker technology.

BACKGROUND OF THE INVENTION

Fiducial markers are two-dimensional ("2D") barcode-like artificial tags or landmarks. They have been used in the field of augmented reality and computer vision. Fiducial markers may be applied in robotic systems, Simultaneous Localization and Mapping (SLAM), package and human detection and tracking, and factory and warehouse management. When in use, they are attached to or printed on the surface of an object. Detection software computes the precise three-dimensional ("3D") position, orientation, and identity of the tags relative to the camera. Designed to be easily recognized and distinguishable from one another, fiducial markers or tags have two key qualities: detection rate and pose accuracy. Detection rate represents the robustness to find one or more markers in an image in adverse conditions. Hence, existence of the tags must be robustly detectable. The tags also need to be robustly identifiable. In addition, the tags should be robustly distinguishable, since there may be multiple tags in an image. Pose accuracy represents the accuracy of tag position and orientation in 3D space.

Prior art fiducial marker systems, such as AprilTag and its predecessors ARToolkit and ARTag, use square box fiducial tags that have a black border and a 2D black and white barcode. Tag detection is accomplished by detecting square-shaped black border(s) in an image. Once a marker is identified, its payload, a 2D barcode within the black border, is decoded against a database of known tags. However, such a design has many drawbacks. First, tags are often attached to or printed on surfaces that may be warped, bended, or wrinkled. As such, their square-shaped black borders can be easily distorted and lose the square shape, therefore leading to the failure of their detection. Thus, the tags may only be used for surfaces which are not warped, bended, or wrinkled or surfaces which may not be warped, bended, or wrinkled in operations. This drawback prevents the prior art fiducial systems' applications in certain areas (e.g., applications where the tags may be worn by a user or in rough conditions).

Second, if partial occlusion occurs in a prior art tag's border area, e.g., a portion of the square-shaped black border is blocked or covered by an object, the border may become an open-loop-shaped object. As the detection software may fail to detect a tag which doesn't have a squared-shaped border, the prior art systems' robustness may be compromised.

Third, the prior art tag's encoded area, which contains a 2D barcode, may become unidentifiable if partial occlusion happens there, even after existence of the tag is detected. Consequently, the systems' robustness may suffer further.

Fourth, the square-shaped black border of the prior art tag takes up significant amount of the tag space, limiting the tag's coded space. As such, it is difficult to reduce the tag size if certain amount of coded space is needed.

Therefore, a new fiducial marker system is needed which is more robust, can be used for adverse tag surface conditions, and has an improved coded area to tag area ratio.

SUMMARY OF THE INVENTION

The present invention discloses fiducial marker systems or tag systems and methods to detect and decode a tag. In one embodiment, a tag comprises a plurality of cells arranged in a grid pattern. The plurality of cells forms a square or rectangular shape. Each cell is in square or rectangular shape and has either black, white, or gray grayscale. Any two cells that share a common borderline should have different grayscales; and the four corner cells of the tag are all in black.

In one embodiment, the method for detecting and decoding such a tag comprises detecting a plurality of connected cells in an image, determining whether the plurality of connected cells in the image have all three grayscales, determining whether total number of cells in the plurality of connected cells is greater than a predetermined threshold, determining whether any two cells in the plurality of connected cells that share a common borderline in the image have different grayscales, and decoding the tag based on the grayscales of the plurality of connected cells in the image.

BRIEF DESCRIPTION OF THE DRAWINGS

The subject matter, which is regarded as the invention, and other features and also the advantages of the invention will be apparent from the following detailed description taken in conjunction with the accompanying drawings.

DETAILED DESCRIPTION

Figure 1A:
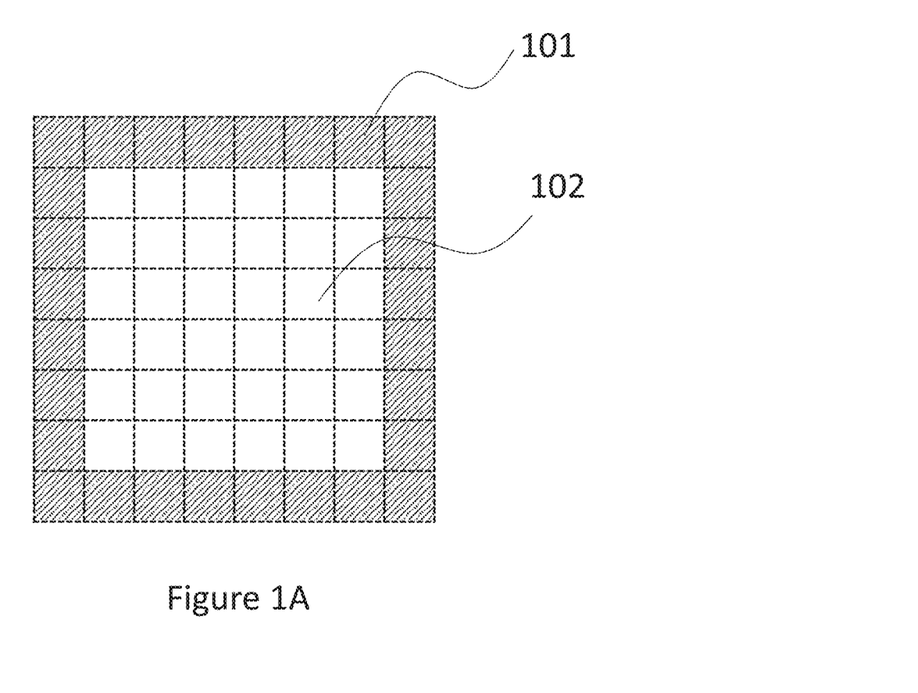
FIG. 1A illustrates a prior art tag design.
Figure 1B:
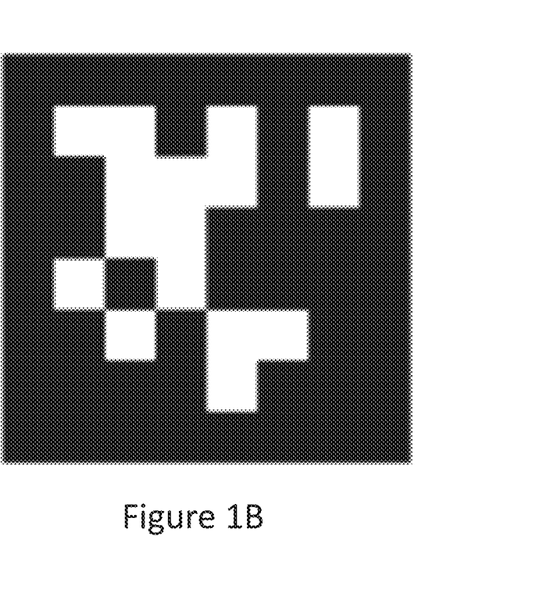
FIG. 1B illustrates an example of a prior art tag.

FIG. 1A illustrates a prior art tag design. As shown, the prior art tag design embodies an 8×8 grid or array containing 64 cells, each of which is a square-shaped block or unit. Each cell is either in black color or white color. The border section 101 (the hatched section shown in FIG. 1A) is always in black color for tag detection. If the detection software cannot detect a square-shaped black border in an image containing a tag, the tag is not detected and is ignored. Detection is generally accomplished by computer vision algorithms, such as Union-find for boundary detection and principal component analysis (PCA) for corner detection. A section 102, which is enclosed by section 101, is used for coding and may be called coded area. For instance, black or white color may be assigned to each cell in section 102 to form a 2D barcode. Thus, although the tag has a total of 64 cells, only 36 cells are actually used for coding, whose maximum coding space is $2^{36}$. The coded area to total tag area ratio is 9:16, which is just slightly above 50%. FIG. 1B illustrates an example of a tag according to this prior art design.

Figure 1C:
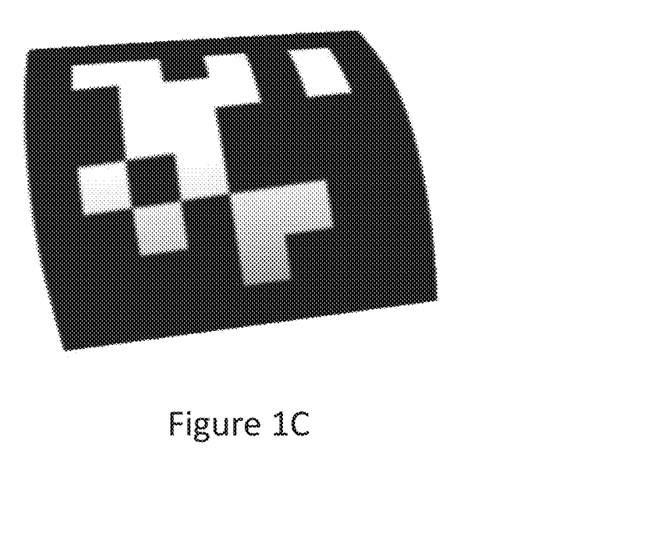
FIG. 1C illustrates a problem with the prior art tag design illustrated in FIG. 1B.

The prior art tag design illustrated in FIGS. 1A and 1B has many drawbacks. FIG. 1C illustrates a problem where a tag shown in FIG. 1B is warped such that the square-shaped black border captured in an image doesn't appear square-shaped anymore. Thus the detection software may not be able to detect the existence of the tag. Nor could the detection software reconstruct the square-shaped border by simply adjusting the view point because the tag itself has warped. This could happen when the tag is printed on or attached to a soft or uneven surface which may be warped, stretched, distorted, or wrinkled. For example, in a factory or warehouse management application, some tags are printed or attached on workers' uniforms or clothes. When a worker moves around, the tag on his/her uniform may get warped, stretched, or distorted. As a result, the detection software won't be able to detect the tag. If this kind of failure happens too often and widespread, the whole system may stop working properly.

Figure 1D:
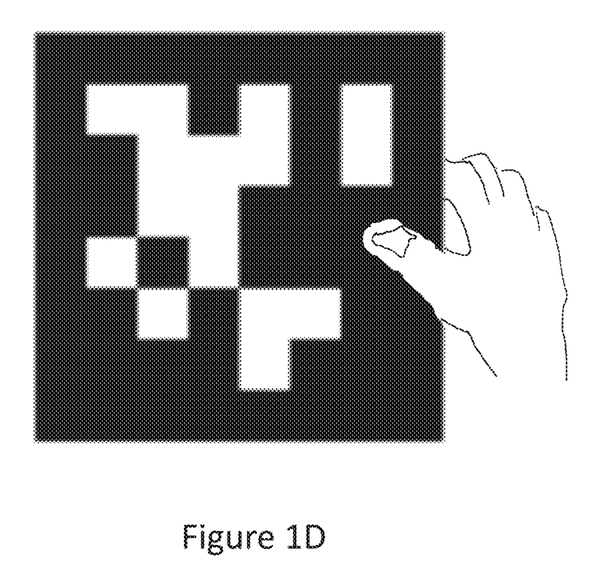
FIG. 1D illustrates another problem with the prior art tag design illustrated in FIG. 1B.

FIG. 1D illustrates another problem with the prior art tag design illustrated in FIG. 1B. As shown, the tag's square-shaped black border is partially covered by a person's thumb. The thumb breaks the closed loop of the border. If any portion of the square-shaped black border is blocked or occluded, the detection software will not be able to detect the tag or the existence of the tag. Because the border section 101 (shown in FIG. 1A) takes up 7/16 of the total tag area, the probability that the border section of the tag is blocked or occluded compared to the probability that coded section 102 (shown in FIG. 1A) is blocked or occluded by an object is 7 to 9. In reality, the ratio should be even higher because when coded section 102 is blocked or occluded by an object (e.g., a hand), the border section is also likely blocked or affected by the same object or any extension of the object (e.g., forearm). As such, the prior art tag designs illustrated in FIGS. 1A and 1B are prone to detection failure.

In addition, if coded section 102 is partial blocked or occluded by an object to a certain extent, the detection software will not be able to decode the 2D barcode. Consequently, the tag may not be identified even though its existence is detected. Thus, a tag may be found, but no information can be extracted from the 2D barcode of the tag.

Figure 2A:
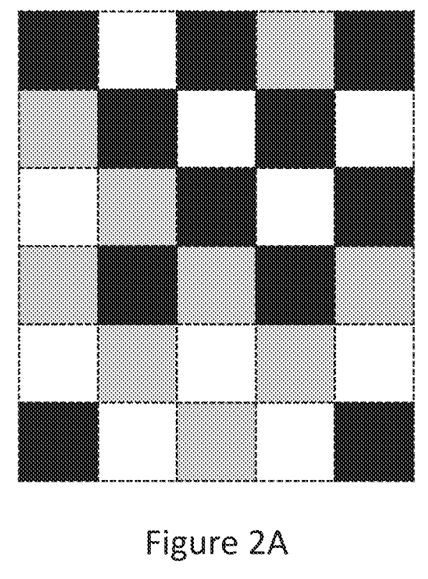
FIG. 2A illustrates a tag design, according to one embodiment of the present invention.

FIG. 2A illustrates an improved tag design, according to one embodiment of the present invention. As shown, the new tag design embodies a rectangular-shaped 6×5 grid, including 30 cells each of which is a square-shaped unit. It should be noted that a cell may have a rectangular shape or other types of shapes. Three grayscales, such as black, white, and gray, are used. In one embodiment, the cells are configured such that any two cells that have a common borderline have different grayscales. In other words, no cells have the same grayscale if they share a borderline. Additionally, the four corner cells of the tag have black grayscale. The corner cells are assigned black color for identification purpose. Further, the detection criteria for a tag is whether a certain number of connected cells have three grayscales and whether any two cells that have a common borderline possess different grayscales. Here, a first cell and a second cell are connected cells (or connected) if the first cell and the second cell share a common borderline or the first cell shares a common borderline with at least one cell from a set of connected cells containing the second cell. If it is determined that a group of connected cells have three grayscales and any two cells that have a common borderline have different grayscales, existence of a tag is detected. The cells may appear in various shapes or patterns besides square shape when a tag surface is not flat. The shape of cells doesn't affect detection of a tag. For instance, instead of a group of cells of square shape, the cells may appear to have other shapes, probably as a result of tag surface conditions. In such a case, tag detection may be performed using the same criteria. Furthermore, additional conditions may be added to tag detection criteria. More conditions make tag detection more robust. For instance, the entire detected tag area should have at least a certain percentage of all cells for each grayscale, such as at least ten percent of all cells for black, white, and gray grayscales respectively. In addition, any four cells of a group which share a corner point should have all three grayscales present. Furthermore, cells of any row or column should have all three grayscales present. It is noted that tag detection criteria may include all or part of the three additional conditions depending on application needs.

Figure 2B:
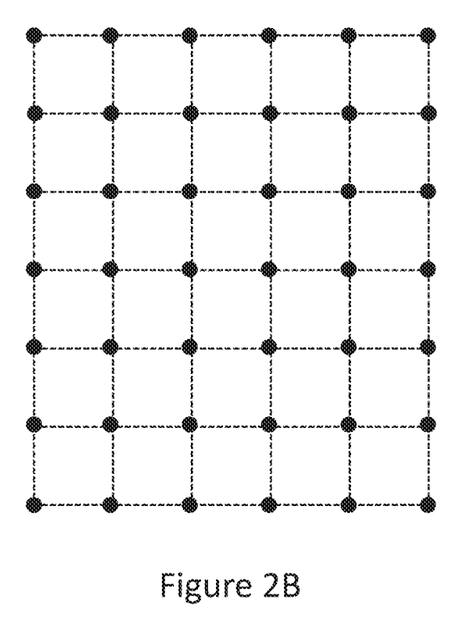
FIG. 2B illustrates a grid configuration of the tag design illustrated in FIG. 2A, according to one embodiment of the present invention.

Since adjacent cells have different grayscales, it is relatively easy to identify each one among all cells of a tag. Moreover, corner points of the cells may be used as grid points. Then, a grid configuration may be obtained as shown in FIG. 2B. A corner point of a cell, except those located on the outline of the tag, is shared by four cells. As aforementioned, the cells have square shape originally as in the figure, but may also appear in different shapes in perspective views or rough surface conditions, which reflect status of the tag including orientation conditions. When the tag surface is warped, for instance, the cells may show up in irregular patterns. As long as the cells are distinguishable, a corner point shared by four cells may be considered as a grid point. For an unknown grid configuration of a tag, grid points within the outline of the tag may be identified first, since these grid points are shared by four cells. Then, grid points on the outline, which are shared by two cells, may be identified. Finally, grid point at the four corners of the tag may be determined. It is noted that a grid configuration may still be detectable even when a tag surface is deformed and the cells are distorted. A grid configuration may be used to ascertain the orientation and surface status of a tag, especially when the tag's surface is not level or not flat.

Back to FIG. 2A. The tag embodies a 6×5 array in rectangular shape, including 30 cells in three grayscales. As mentioned, the four corner cells have black grayscale. The remaining 26 cells form a coded area and are used to create a 2D barcode. The coded area to total tag area ratio is 13:15, much larger than 50%. As illustrated in discussions below, this design is more robust in dealing with adverse tag surface conditions.

Figure 3A:
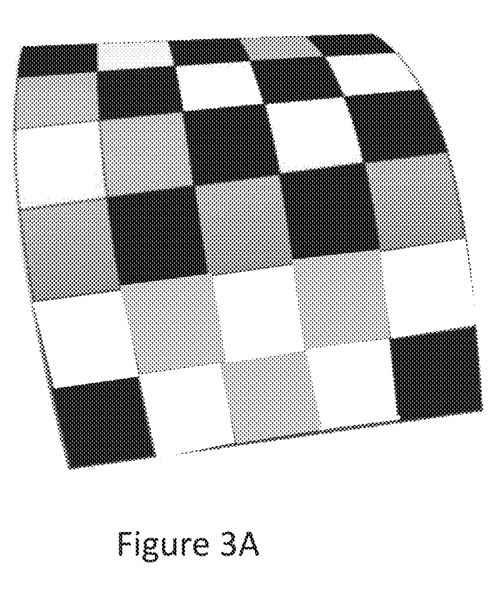
FIG. 3A illustrates an uneven tag surface of the tag design illustrated in FIG. 2A, according to one embodiment of the present invention.

FIG. 3A illustrates a warped tag surface, according to one embodiment of the present invention. The tag has the same design as that illustrated in FIG. 2A. When the tag surface is flat, it has a rectangular shape formed by the cells. When the tag surface warps as in FIG. 3A, the tag's rectangular shape is deformed and becomes an irregular pattern. In such a situation, a prior art method may fail to detect the tag, as there would be no square-shaped black border. Because the tag in FIG. 3A consists of cells which are configured in a more distinguishable manner than the prior art designs, the tag may still be detected. For instance, the detection software may detect whether there is a certain number of connected cells which have three grayscales, black, white, and gray. Then, the detection software may ascertain whether any two cells which have a common borderline possess different grayscales. If the answers are positive, i.e., there is a group of connected units which have three grayscales and any two units which have a common borderline possess different grayscales, the detection software may conclude that a tag or existence of a tag is detected. During the detection process, the shape of a cell is observed but it doesn't affect the detection result. Whether the units have square shape or irregular shape doesn't change the detection outcome. Hence, once it is determined that the two answers are positive, a tag is detected. Next, the four corner cells, which all have black grayscale, are detected. The corner cells may be used to calculate orientation status of the tag.

Figure 3B:
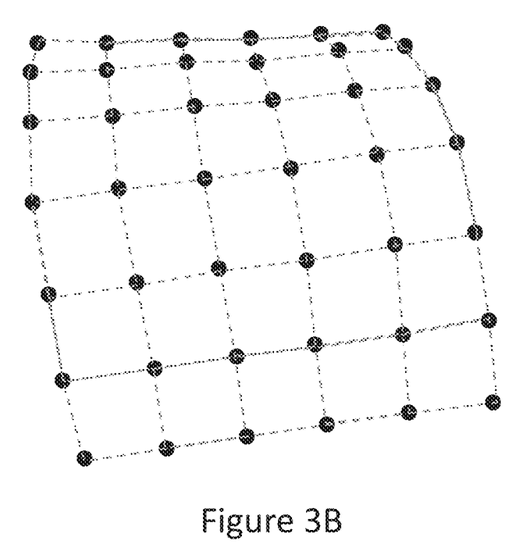
FIG. 3B illustrates a distorted grid for the uneven tag surface illustrated in FIG. 3A, according to one embodiment of the present invention.

Based on the image in FIG. 3A, a grid configuration is obtained as shown in FIG. 3B. As aforementioned, each grid point is shared by four cells except those located on the outline of a tag. Even when the cells are distorted, such as the case in FIG. 3A, a corner point shared by four cells may still be detectable, if the cells are detectable. A grid configuration may be used to ascertain orientation of a tag.

When information on the four corner cells of a tag is known, information about orientation status of the tag may be calculated using the four cells. If for some reasons, like a warped tag surface or partial occlusion, one or more corner cells may become invisible or unidentifiable, orientation status may not be calculated using such a method. However, if the grid configuration of the tag is available, the orientation or pose of the tag may still be calculated or estimated. Thus, without direct detection of one or more corner cells, orientation or pose status may still be obtained. For instance, position of a missing corner cell of a tag may be estimated using grid points around the missing unit. Then the pose of the tag may be calculated using the estimated corner cell and grid information via algorithms. Thus, a tag's pose may be calculated by algorithms based on grid configuration, when one or more of the corner cells cannot be detected directly.

Figure 4A:
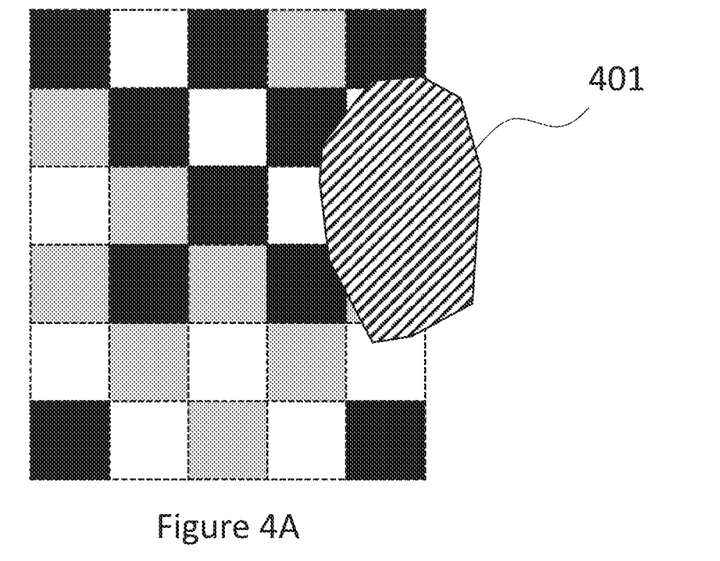
FIG. 4A illustrates a partially occluded tag surface of the tag design illustrated in FIG. 2A, according to one embodiment of the present invention.
Figure 4B:
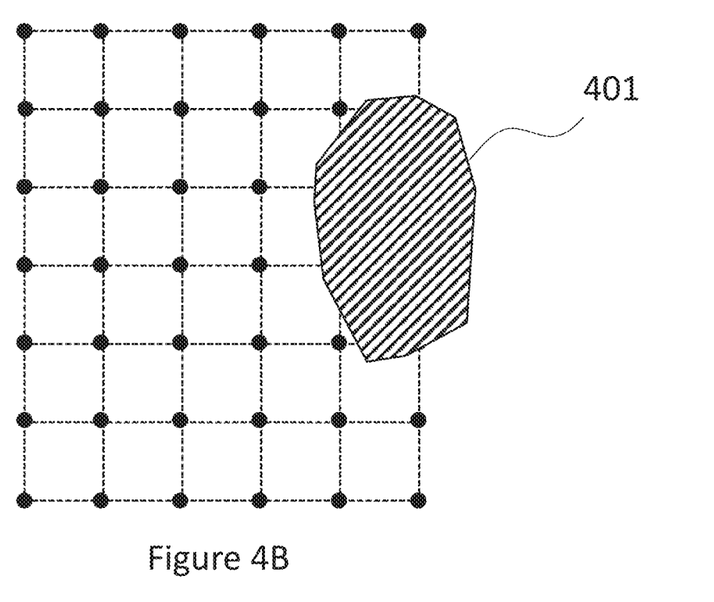
FIG. 4B illustrates a grid for the occluded tag surface illustrated in FIG. 4A, according to one embodiment of the present invention.

FIG. 4A illustrates a partially occluded tag, according to one embodiment of the present invention. The tag has the same pattern as that in FIG. 2A. The occlusion is caused by an object 401. It is assumed that object 401 makes three cells unidentifiable, while the remaining cells can be detected. A grid configuration, as shown in FIG. 4B, may be obtained from the image in FIG. 4A. During an ascertaining process, for instance, it may be detected that there are certain number of connected cells which have three grayscales and any two units which have a common borderline, except the unknown ones, have different grayscales. Thus a tag is found. Next the four black corner cells and a grid configuration are detected. The four corner cells or the grid configuration may be used to detect pose information of the tag.

Figure 4C:
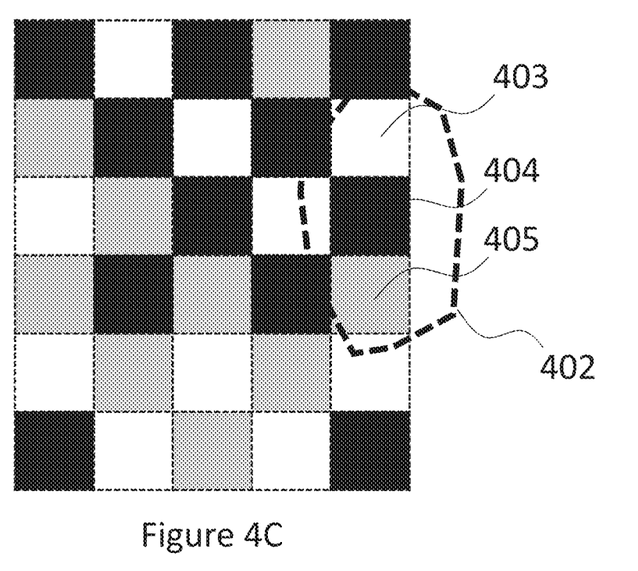
FIGS. 4C and 4D illustrate two possible tag patterns derived from the tag image in FIG. 4A, according to one embodiment of the present invention.
Figure 4D:
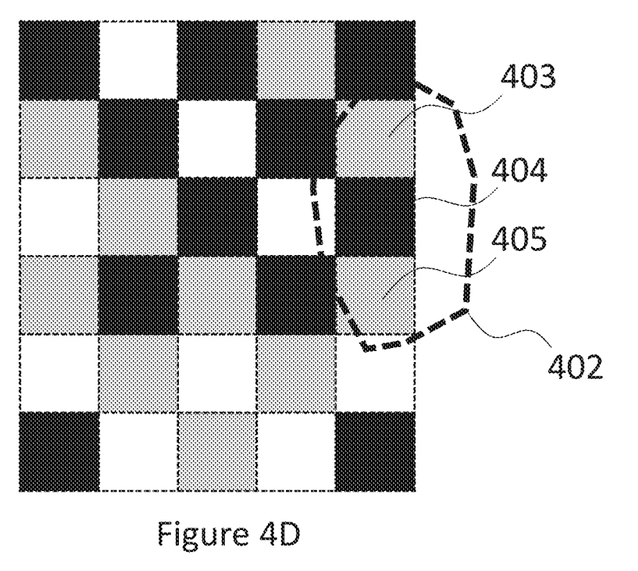

Even though a tag in FIG. 4A is detected, the tag may not be identified since the coded area has partial occlusion. More specifically, three units are covered by object 401. The three unknown units cause the 2D barcode to appear damaged. Consequently decoding of the tag becomes impossible. However, since any two units which have a common borderline must have different grayscales and there are only three grayscales in use, the grayscale of the three unknown units may be estimated. For instance, FIGS. 4C and 4D illustrate two possibilities and there are only two possibilities in this occlusion case. In FIGS. 4C and 4D, a broken line 402 represents the outline of object 401. The grayscale of cells 403, 404, and 405 is unknown. Cell 405 has a neighbor in black grayscale and a neighbor in white grayscale. Thus the grayscale of cell 405 must be gray to make any two cells which have a common borderline possess different grayscales. When cell 405 has gray scale, cell 404 must have black scale, since it has a white neighbor and a gray neighbor already. If cell 404 has black grayscale, the last unknown cell 403 has three black neighbors. Hence, there are two grayscale options for cell 403, white or gray grayscale, which are reflected in FIGS. 4C and 4D respectively.

Therefore, for the tag in FIGS. 4A-4D, problems caused by object 401 may be overcome by algorithms. As discussed, when occlusion happens, grayscale of the unknown cells may be estimated. In the above example, the estimation process yields two possible tag patterns and each tag pattern has fifty percent of chances to be true. Moreover, if there is a tag database which contains a group of pre-selected (or valid) tags, the Hamming distance may be calculated by using each of the preselected tags. For instance, the Hamming distance may be obtained for the two patterns in FIGS. 4C and 4D respectively. Then a pattern which has the shortest Hamming distance among all Hamming distances may be chosen. If the shortest Hamming distance is smaller than a given value, the pattern may be considered as the detected pattern. Thus, when a tag has partial occlusion, the tag may still be detected, its pose be ascertained, and its 2D barcode be at least partially decoded. If a tag can't be identified directly, values of probability of multiple tag patterns may be calculated respectively and a tag pattern which has the shortest Hamming distance may be selected. If the shortest Hamming distance is below a given value, the pattern is considered as a detected pattern. If the shortest Hamming distance is equal to or larger than the given value, it may be considered that no tag is detected.

Figure 5:
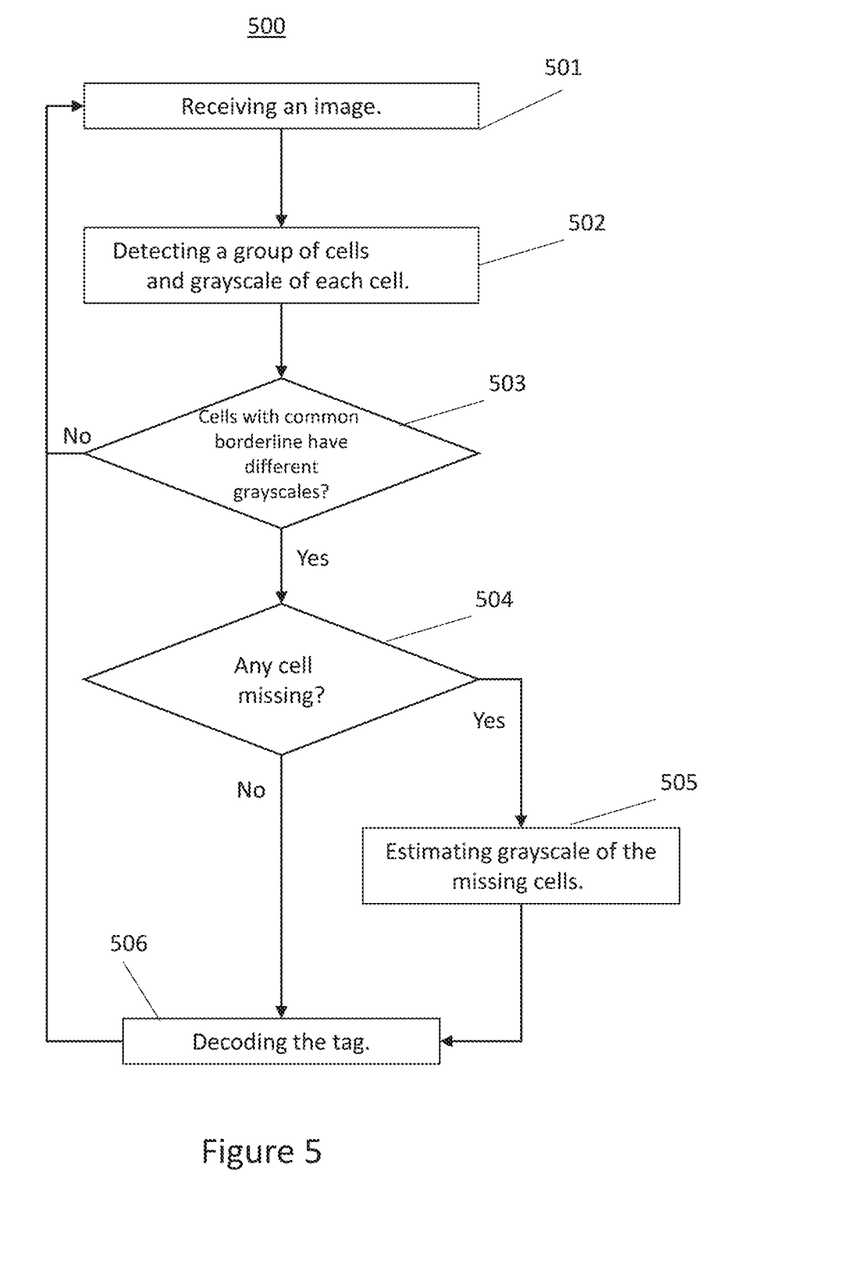
FIG. 5 shows a flow diagram that illustrates a process of detecting and identifying a tag, according to one embodiment of the present invention.

FIG. 5 illustrates a flow diagram of a process 500 for detecting and identifying a tag, according to one embodiment of the present invention. At step 501, process 500 receives an image via a working camera. As aforementioned, the image may contain a tag on a warped surface or partially occluded by an object.

At step 502, process 500 scans the image to find a group of connected cells and detects grayscale of each unit. Various computer vision algorithms may be used for finding information on the cells. At step 503, process 500 determines whether the cells have three grayscales, black, white, and grey. Process 500 also determines whether any two cells which have a common borderline possess different grayscales. If one answer or both answers are negative, process 500 aborts the tag detection and goes back to step 501 to work on another case. If both answers are positive, process 500 considers that a tag is detected and starts measuring and recording the tag's relative position to the camera. Next, process 500 ascertains cells along the tag's outline to find four corner cells which should have black grayscale. If fewer than four corner cells are detected, it may mean one or more corner cells become invisible due to incidents such as warped surface or partial occlusion. In addition, a grid configuration of the tag is calculated using information on the cells. The grid configuration may appear incomplete due to tag surface conditions or partial occlusion. Using information about the corner cells and the grid configuration, the tag's pose or orientation may be calculated through algorithms.

At step 504, process 500 has two options depending on whether there are any missing cells. A missing cell is a cell which is invisible in the image due to reasons such as tag surface warping or occlusion caused by an object. If there is no missing unit, process 500 starts a decoding process at step 506. The tag may be fully identified after obtaining information on the position, the pose, and contents extracted from the tag's 2D barcode. After getting the information at step 506, process 500 returns to step 501 and begins working to find another tag in the image. If there is a missing cell, process 500 may use grayscale of the detected cells which share a borderline with the missing cell to estimate the grayscale of the missing cell at step 505. If there are multiple missing cells, process 500 may estimate grayscales of the missing cells respectively. Then estimated tag patterns may be constructed using possible grayscales of the missing cells. Probability and the Hamming value of each estimated tag pattern may be calculated. Then at step 506, process 500 may decode the estimated patterns which contain the estimated grayscales respectively. Next, process 500 may go back to step 501 and detect whether there is another tag in the image.

Although specific embodiments, grid or array configurations (e.g., 5×6 array), and orientations of the invention have been disclosed, those having ordinary skill in the art will understand that changes can be made to the specific embodiments, grid or array dimensions, and orientations without departing from the spirit and scope of the invention. The scope of the invention is not to be restricted, therefore, to the specific embodiments. The embodiments or examples presented herein are for illustration purposes and should not be interpreted to limit the scope of the present invention.

The invention claimed is:

1. A method for detecting and decoding a square-shaped or rectangular-shaped tag captured in an image, the tag being divided into cells based on a grid pattern, each cell being square shape or rectangular shape, the method comprising:
   detecting a plurality of connected cells in the image;
   determining whether the plurality of connected cells in the image have all three grayscales consisting of a black grayscale, a white grayscale, and a gray grayscale;
   determining whether a total number of cells in the plurality of connected cells is greater than a predetermined threshold;
   determining whether a grayscale of a first cell of any two cells in the plurality of connected cells that share a common borderline in the image is different from a grayscale of a second cell of the two cells; and
   decoding the tag based on grayscales of the plurality of connected cells in the image.

2. The method of claim 1, wherein the tag has four corner cells which are all in the black grayscale and the method further comprises determining whether the plurality of connected cells detected in the image includes the four corner cells.

3. The method of claim 1 further comprising determining whether at least a predetermined percentage of the plurality of connected cells has the black grayscale, the white grayscale, and the gray grayscale, respectively.

4. The method of claim 1 further comprising determining whether any four cells sharing a same corner point have all of the three grayscales.

5. The method of claim 1 further comprising determining whether any row of cells or column of cells from the plurality of connected cells has all of the three grayscales.

6. The method of claim 1 further comprising determining that a cell of the tag is missing from the plurality of connected cells and estimating the missing cell's grayscale based on a set of rules including any two cells of the tag that share a common borderline have different grayscales.

7. The method of claim 6, wherein the set of rules further includes a decoded value of the tag based on the grayscales of the plurality of connected cells in the image and the estimated grayscale of the missing cell matches a valid tag in a tag database.

8. A system for using a fiducial marker, comprising:
   a square-shaped or rectangular-shaped tag, the tag being divided into cells based on a grid pattern, each cell being square shape or rectangular shape;
   a camera for capturing an image comprising the tag; and
   a processing unit that executes instructions to perform steps comprising:
      detecting a plurality of connected cells in the image;
      determining whether the plurality of connected cells in the image have all three grayscales consisting of a black grayscale, a white grayscale, and a gray grayscale;
      determining whether a total number of cells in the plurality of connected cells is greater than a predetermined threshold;
      determining whether a grayscale of a first cell of any two cells in the plurality of connected cells that share a common borderline in the image is different from a grayscale of a second cell of the two cells; and
      decoding the tag based on grayscales of the plurality of connected cells in the image.

9. The system of claim 8, wherein the tag has four corner cells which are all in the black grayscale and the steps further comprise determining whether the plurality of connected cells detected in the image includes the four corner cells.

10. The system of claim 8, wherein the steps further comprise determining whether at least a predetermined percentage of the plurality of connected cells has the black grayscale, the white grayscale, and the gray grayscale, respectively.

11. The system of claim 8, wherein the steps further comprise determining whether any four cells sharing a same corner point have all of the three grayscales.

12. The system of claim 8, wherein the steps further comprise determining whether any row of cells or column of cells from the plurality of connected cells has all of the three grayscales.

13. The system of claim 8, wherein the steps further comprise determining that a cell of the tag is missing from the plurality of connected cells and estimating the missing cell's grayscale based on a set of rules including any two cells of the tag that share a common borderline have different grayscales.

14. The system of claim 13, wherein the set of rules further includes a decoded value of the tag based on the grayscales of the plurality of connected cells in the image and the estimated grayscale of the missing cell matches a valid tag in a tag database.

15. A two-dimensional barcode printed on a surface of an object, comprising:
   a plurality of cells arranged in a grid pattern, the plurality of cells forming a square or rectangular shape, each cell having one of a black grayscale, a white grayscale, and a gray grayscale, a grayscale of a first cell of any two cells in the plurality of cells that share a common borderline being different from a grayscale of a second cell of the two cells, and four corner cells all in the black grayscale.

16. The two-dimensional barcode printed on a surface of an object as claimed in claim 15, wherein any row of cells or column of cells from the plurality of cells has all of the black grayscale, white grayscale, and gray grayscale.

17. The two-dimensional barcode printed on a surface of an object as claimed in claim 15, wherein any four cells sharing a same corner point have all of the black grayscale, white grayscale, and gray grayscale.

18. The two-dimensional barcode printed on a surface of an object as claimed in claim 15, wherein each cell is in square shape or rectangular shape.

\* \* \* \* \*